United States Patent
Kates et al.

(10) Patent No.: US 8,116,727 B1
(45) Date of Patent: Feb. 14, 2012

(54) METHOD AND SYSTEM FOR DETERMINING AND PRESENTING A CURRENT LIKELIHOOD OF A MOBILE STATION SUCCESSFULLY ENGAGING IN A COMMUNICATION SESSION

(75) Inventors: Jesse Kates, Kansas City, MO (US); Kristen Miller, Olathe, KS (US); Balaji S. Thenthiruperai, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 901 days.

(21) Appl. No.: 12/142,735

(22) Filed: Jun. 19, 2008

(51) Int. Cl.
*H04M 11/00* (2006.01)
*H04M 1/00* (2006.01)
*H04M 3/42* (2006.01)

(52) U.S. Cl. .................. 455/405; 455/414.1; 455/550.1; 455/566

(58) Field of Classification Search .................. 455/405, 455/423, 424, 425
See application file for complete search history.

(56) References Cited

U.S. PATENT DOCUMENTS

| | | | | |
|---|---|---|---|---|
| 6,359,976 | B1 * | 3/2002 | Kalyanpur et al. | 379/134 |
| 7,925,690 | B2 * | 4/2011 | Smith et al. | 709/203 |
| 2006/0183472 | A1 * | 8/2006 | Nookala et al. | 455/426.1 |
| 2007/0049243 | A1 * | 3/2007 | Voss | 455/405 |
| 2009/0274286 | A1 * | 11/2009 | O'Shaughnessy et al. | 379/201.12 |

* cited by examiner

*Primary Examiner* — Michael Thier

(57) ABSTRACT

Methods and systems are provided for determining and presenting a current likelihood of a mobile station successfully engaging in a communication session. In an embodiment, the mobile station (or a network entity) records call data that is indicative of successful and unsuccessful attempts by the mobile station to engage in communication sessions over a period of time. The mobile station (or the network entity) determines, based at least in part on the recorded call data, a current likelihood of the mobile station successfully engaging in a communication session. The mobile station presents a forecast indication to a user of the mobile station, the forecast indication reflecting the determined current likelihood.

17 Claims, 10 Drawing Sheets

| TELEPHONE NUMBER | TIME | DAY | LONG | LATITUDE | SIGNAL STRENGTH | SUCCESSFUL/ UNSUCCESSFUL |
|---|---|---|---|---|---|---|
| 375-555-3751 | 14:10 | MON | LONG 1 | LAT 1 | 20 | N |
| 666-555-1234 | 15:10 | MON | LONG 2 | LAT 2 | 19 | Y |
| 375-555-3751 | 18:10 | MON | LONG 3 | LAT 3 | 15 | Y |
|  |  |  |  |  |  |  |
|  |  |  |  |  |  |  |

CALL-ATTEMPT TABLE 400

FIG. 4

METHOD AND SYSTEM FOR DETERMINING AND PRESENTING A CURRENT LIKELIHOOD OF A MOBILE STATION SUCCESSFULLY ENGAGING IN A COMMUNICATION SESSION

BACKGROUND

Many people use mobile stations (i.e., client devices), such as cell phones and personal digital assistants (PDAs), to communicate with cellular wireless networks. These client devices and networks typically communicate with each other over a radio frequency (RF) air interface according to a wireless protocol such as Code Division Multiple Access (CDMA), perhaps in conformance with one or more industry specifications such as IS-95 and IS-2000. Wireless networks that operate according to these specifications are often referred to as "1×RTT networks" (or "1× networks" for short), which stands for "Single Carrier Radio Transmission Technology." Another protocol that may be used is known as Evolution Data Optimized (EV-DO), perhaps in conformance with one or more industry specifications such as IS-856, Release 0 and IS-856, Revision A. Other protocols may be used as well, such as Global System for Mobile Communications (GSM), Time Division Multiple Access (TDMA), WiMax, and/or any others.

In a typical cellular wireless network, an area is divided geographically into a number of cell sites, each defined by a radio frequency (RF) radiation pattern from a respective base transceiver station (BTS) antenna. Each BTS antenna in a cell is in turn coupled with a base station controller (BSC), cooperatively defining a base station system. And the BSC is then coupled to or functionally integrated within a switch (e.g., a mobile switching center (MSC)) and/or gateway (e.g., a packet data serving node (PDSN)) that provides connectivity with a transport network such as the PSTN (public switched telephone network) or a public or private IP network (e.g., the Internet).

When a mobile station, such as a cellular telephone, pager, or appropriately equipped portable computer, for instance, is positioned in a cell, the mobile station communicates via an RF air interface with the BTS antenna of the cell. Consequently, a communication session can be established between the mobile station and another entity on the transport network, via the air interface, the BTS, the BSC and the switch or gateway. Such a communication session may be referred to as a "call," whether the communication is a traditional voice "call" or a more advanced data session.

BRIEF DESCRIPTION OF THE DRAWINGS

Various exemplary embodiments are described herein with reference to the following drawings, wherein like numerals denote like entities.

FIG. 4 illustrates a call attempt table showing an exemplary set of data that may be stored in a call-data database, in accordance with exemplary embodiments;

DETAILED DESCRIPTION OF THE DRAWINGS

1. Overview

Figure 1:
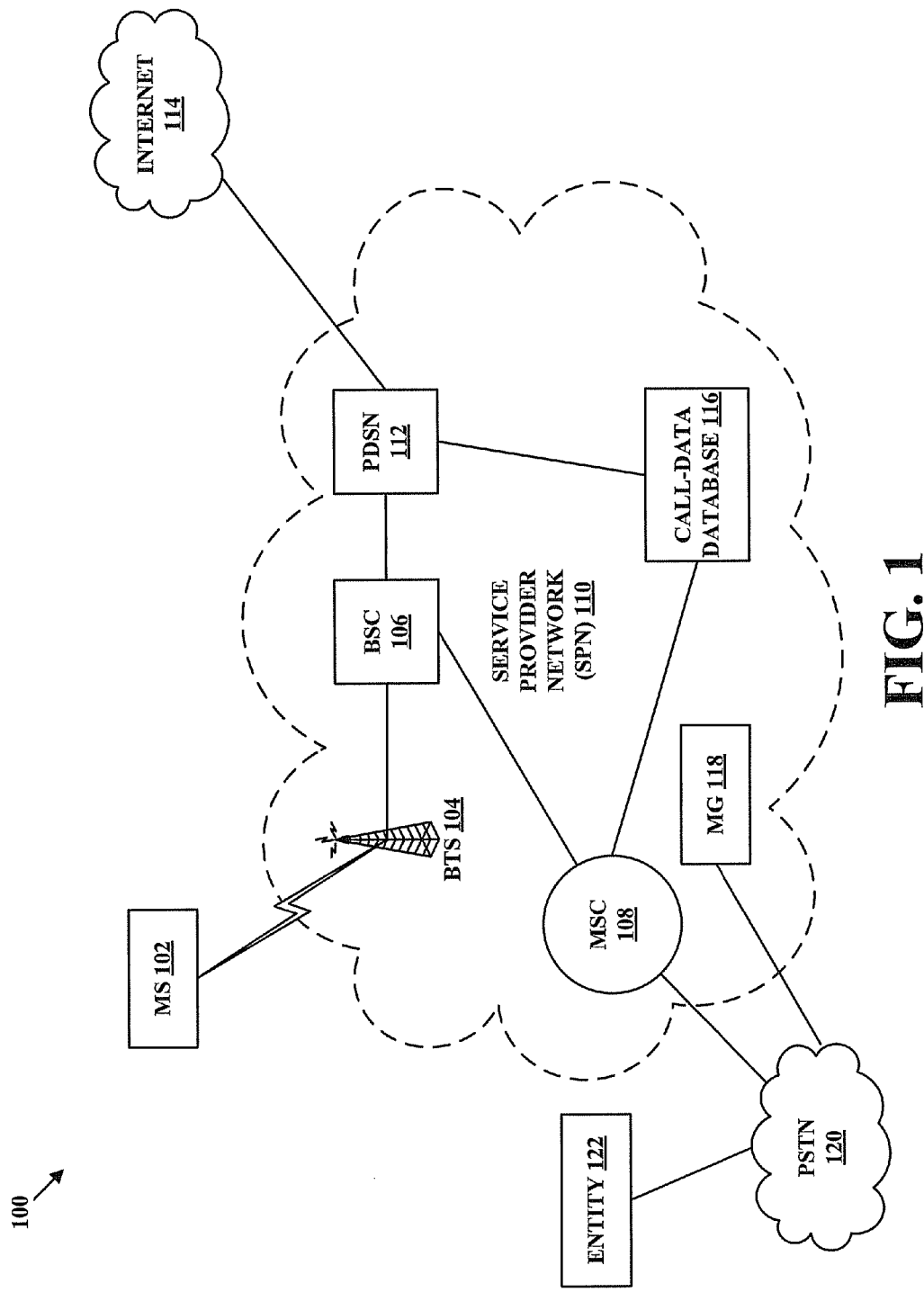
FIG. 1 is a simplified block diagram of a communication system, in accordance with exemplary embodiments.

The present invention is directed to determining and presenting a current likelihood of a mobile station successfully engaging in a communication session. In an exemplary embodiment, the mobile station records call data that is indicative of successful and unsuccessful attempts by the mobile station to engage in communication sessions over a period of time. The mobile station determines, based at least in part on the recorded call data, a current likelihood of the mobile station successfully engaging in a communication session. Thereafter, the mobile station presents a forecast indication to a user of the mobile station, the forecast indication reflecting the determined current likelihood.

It should be noted that some of the steps such as recording call data pertaining to the mobile station and/or determining the current likelihood of the mobile station successfully engaging in a communication session could be carried out by the mobile station in cooperation with one or more network entities, such as a BSC, MSC, and/or a PDSN or by those entities themselves. In this regard, it should be understood that the steps described herein could be carried out by any one or any combination of the devices and/or entities and/or network elements described herein, and/or any other network element(s). In one embodiment, the MSC may record call data pertaining to the mobile station over a first period of time. The BSC may then query the MSC for the recorded call data and determine a current likelihood of the mobile station successfully engaging in a communication session. Thereafter, the BSC may send the determined current likelihood to the mobile station (over an air interface). The mobile station may present a forecast indication to a user of the mobile station, the forecast indication reflecting the determined current likelihood.

A successful attempt or an unsuccessful attempt may be defined in many ways. In one embodiment, a successful attempt (by the mobile station to engage in a communication session) could be one in which a call to a particular telephone number is answered by a user at that particular telephone number, while an unsuccessful attempt could be one in which a call to a particular telephone number is not answered (i.e., an unanswered call) by the user (at the particular called telephone number). As an example, an unanswered call to the particular called telephone number could include a situation in which the call is forwarded to a voicemail account associated with the particular called telephone number. As another example, an unanswered call to the particular called telephone number could include a situation in which the calling party hangs up or disconnects the call before the call is answered or before the call is forwarded to a voicemail account.

In an alternative embodiment, a successful attempt by the mobile station could be one in which a call is established and completed without the call being dropped, while an unsuccessful attempt could be one in which the call is dropped or where there was a failure to even establish the call in the first place. As an example, an established and completed call could be one that is affirmatively disconnected (by closing a flip phone or pressing "End," as examples) by either party (the calling party or the called party) once their conversation is over.

Regardless of how a successful attempt or an unsuccessful attempt may be defined, call data pertaining to the mobile station is recorded, the call data comprising data indicative of successful and unsuccessful attempts by the mobile station to engage in communication sessions over a first period of time. In one embodiment, the mobile station may record call data pertaining to a particular called telephone number. In this embodiment, the mobile station may record a time of day and a day of the week for each successful attempt and unsuccessful attempt to the particular called telephone number. Further, in the same embodiment or in an alternative embodiment, the mobile station may record a location of the mobile station, perhaps as well as a trajectory of the mobile station for each successful attempt and unsuccessful attempt.

After the call data pertaining to the attempted calls from the mobile station for a first period of time have been recorded, a current likelihood of the mobile station successfully engaging in a communication session is determined, based at least in part on the recorded call data. The current likelihood (of the mobile station successfully engaging in a communication session) may be determined in many ways; two embodiments are explained below.

In a first embodiment, the mobile station may determine, based at least in part on the recorded call data, a current likelihood of an answered call at a particular called telephone number. The particular called telephone number may be stored in an entry of an address book, which may be stored on the mobile station and/or on a network entity. The mobile station may determine the current likelihood by correlating the current time of day and day of the week with at least one recorded time of day and day of the week to determine the current likelihood of an answered call to the particular called telephone number. In this embodiment, a particular called telephone number for which the mobile station was successful in establishing a communication session on the same day as the current day and/or around the same time as the current time may have a higher current likelihood than a particular called telephone number for which the mobile station was unsuccessful in establishing a communication session.

Further, in this embodiment, after the mobile station determines the current likelihood, the mobile station presents a forecast indication reflecting the determined current likelihood of an answered call at the particular called telephone number. In one example, the mobile station may present the forecast indication in an entry of the address book. In this example or another example, the forecast indication may be a visual indication, such as a color scheme in which (i) a first color may indicate that an answered call is more likely than an unanswered call and (ii) a second color, different from the first color, may indicate that an unanswered call is more likely than an answered call. Alternatively, the forecast indication could be in the form of graphical icons, sound-bytes, or any type of indication (or combination of one or more indications) capable of reflecting the determined likelihood. And other possibilities exist as well.

In an another embodiment, the mobile station may determine, based at least in part on the recorded call data, a current likelihood of the mobile station successfully engaging in any call that a mobile station may attempt to make (rather than treating called numbers individually). In this embodiment, the mobile station may determine the current likelihood by comparing a current time of day with at least one recorded time of day, and/or comparing a current day of the week with at least one recorded day of the week, comparing a current location of the mobile station with at least one recorded location of the mobile station, and/or comparing a current trajectory of the mobile station with at least one recorded trajectory of the mobile station. By comparing the mobile station's current "circumstances" (i.e., current location, time, day, and/or trajectory) with recorded "circumstances" (i.e., recorded location, time, day, and/or trajectory), the mobile station may determine a current likelihood of the mobile station successfully engaging in a communication session. In particular, the more current "circumstances" that substantially match (or are substantially similar) to the recorded "circumstances," the greater the current likelihood of the mobile station successfully engaging in a communication session.

Further, in this embodiment, after the mobile station determines the current likelihood of success, the mobile station presents a forecast indication to a user of the mobile station. The forecast indication may be presented in a home screen or main screen of the mobile station, among other user-interface options. The forecast indication may be a visual indication including at least one textual phrase selected from the group consisting of "Clear and Sunny", "Overcast and Cloudy", and "Rainy and Wet," in which in which (i) the phrase "Clear and Sunny" may indicate that a successful attempt is more likely than an unsuccessful attempt from the mobile station, (ii) the phrase "Overcast and Cloudy," may indicate that an successful attempt is less likely than an unsuccessful attempt, and (iii) the phrase "Rainy and Wet," may indicate that a successful attempt is not likely at all. Alternatively, the forecast indication could be in the form of graphical icons, sound-bytes, or any type of indication (or combination of one or more indications) capable of reflecting the one or more determined likelihood(s). And other possibilities exist as well.

In either one of the two embodiments discussed above, the mobile station may determine the current likelihood of the mobile station successfully engaging in a communication session on a real time basis. For instance, as one example, the mobile station may determine the one or more current likelihoods each time a user accesses an "Address Book" application. As another example, the mobile station may determine the current likelihood as the user scrolls through his address book. As yet another example, the mobile station may determine the current likelihood at fixed time intervals throughout the day.

Alternatively, the mobile station may determine the current likelihood of the mobile station successfully engaging in a communication session overnight by a network entity. It should be understood that the network entity is not limited to determining a single current likelihood and may determine multiple current likelihoods. For instance, in one embodiment, the network entity may determine three different current likelihoods for a particular called telephone number, in which each of the three likelihoods corresponds to a time period during a given day. As an example, the first determined current likelihood may correspond to a time period between 4:00 AM to 12:00 PM, the second determined current likelihood may correspond to a time period between 12:00 PM to 8:00 PM, and the third determined current likelihood may correspond to a time period between 8:00 PM to 4:00 AM. Other time periods are also possible. In this embodiment, the network entity may provision the mobile station with all three current likelihoods for the particular called telephone number every morning at 4:00 AM. The mobile station may then, during each time period, present a forecast indication (e.g., an icon) reflecting the corresponding determined current likelihood.

Regardless of when and where the determination of the one or more current likelihoods of success is made, the determination may be made only after the user of the mobile station has attempted to call (whether the calls be unsuccessful or successful) during a first period of time. In one embodiment, the first period of time may be a predetermined number of weeks or months during which mobile station has attempted to call a particular called telephone number for at least a predetermined number of times.

2. Exemplary Architecture a. An Exemplary Communication System

FIG. 1 is a simplified block diagram of a communication system, in accordance with exemplary embodiments. It should be understood that this and other arrangements described herein are set forth only as examples. Those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. Various functions may be carried out by a processor executing instructions stored in memory.

As shown in FIG. 1, a communication system 100 includes a mobile station 102, a BTS 104, a BSC 106, a mobile switching center (MSC) 108, a service provider network (SPN) 110, PDSN 112, the Internet 114, a call-data database 116, a media gateway (MG) 118, a public switched telephone network (PSTN) 120, and an entity 122. And additional entities could be present, such as additional mobile stations in communication with BTS 104, additional entities in communication with Internet 114 and/or PSTN 120, etc. Also, there could be one or more devices and/or networks making up at least part of one or more communication links. For example, there could be one or more routers, cable modems, and/or other devices or networks on the link between PDSN 112 and Internet 114.

Figure 2:
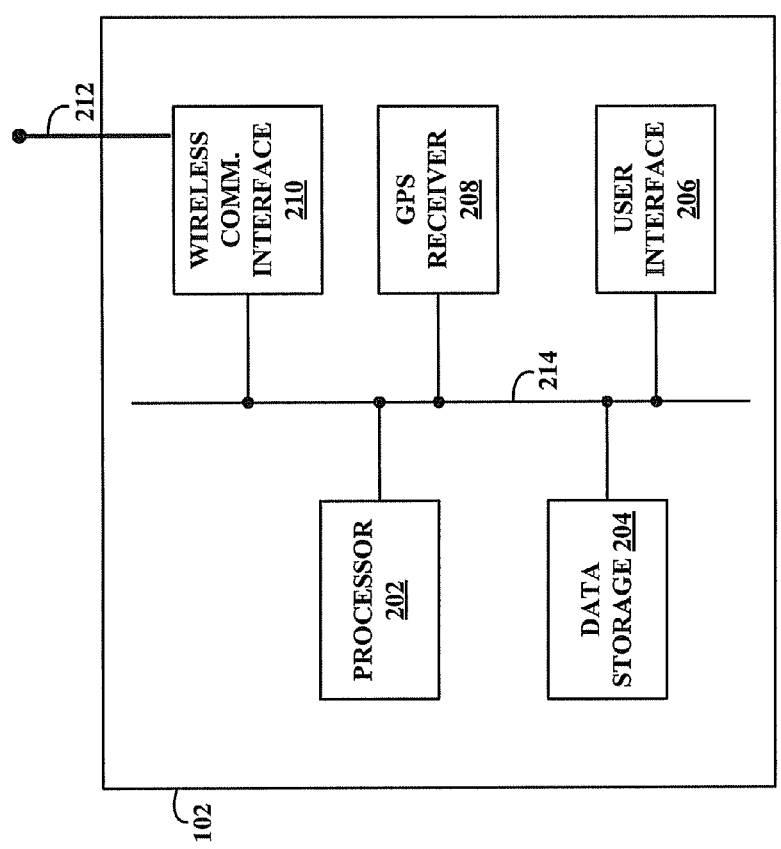
FIG. 2 is a simplified block diagram of a mobile station, in accordance with exemplary embodiments.

Mobile station 102, which is described more fully in connection with FIG. 2, may be any mobile device arranged to carry out the mobile-station functions described herein. As such, mobile station 102 may include a user interface, a wireless-communication interface, a processor, and data storage comprising instructions executable by the processor for carrying out those mobile-station functions.

BTS 104 may be any network element arranged to carry out the functions described herein. As such, BTS 104 may include a communication interface, a processor, and data storage comprising instructions executable by the processor to carry out these BTS functions. The communication interface may include one or more antennas, chipsets, and/or other components for providing one or more CDMA coverage areas such as cells and sectors, for communicating with client devices such as mobile station 102 over an air interface. The communication interface may also include one or more wired (e.g. Ethernet) and/or wireless (e.g. WiFi) interfaces for communicating with at least BSC 106.

Figure 3:
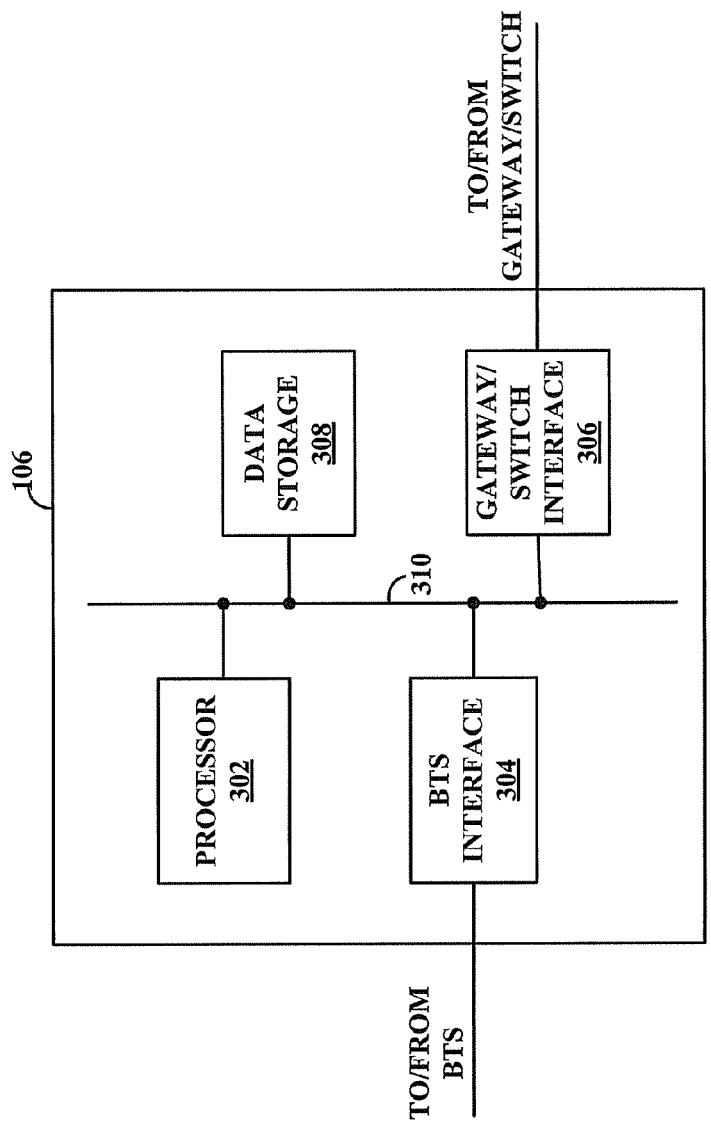
FIG. 3 is a simplified block diagram of a base station, in accordance with exemplary embodiments.

BSC 106, which is described more fully in connection with FIG. 3, may be any network entity arranged to carry out the BSC functions described herein. As such, BSC 106 may include a communication interface, a processor, and data storage comprising instructions executable by the processor to carry out those BSC functions. The communication interface may include one or more wired and/or wireless interfaces for communicating with at least BTS 104, MSC 108, and PDSN 112. In general, BSC 106 functions to control one or more BTSs such as BTS 104, and to provide those one or more BTSs with connections to devices such as MSC 108 and PDSN 112.

Note that the combination of BTS 104 and BSC 106 may be considered a base station. However, BTS 104 or BSC 106 could, taken alone, be considered a base station as well. Furthermore, a base station may be considered to be either or both of those devices, and perhaps make use of one or more functions provided by MSC 108, PDSN 112, and/or any other entity, without departing from the invention. And it should be noted that the BTS 104 and/or BSC 106 described herein may operate according to CDMA, EV-DO, iDEN, TDMA, AMPS, GSM, GPRS, UMTS, EDGE, WiMAX (e.g., IEEE 802.16), LTE, microwave, satellite, MMDS, Wi-Fi (e.g., IEEE 802.11), Bluetooth, infrared, and/or any other wireless technology or technologies now known or later developed.

MSC 108 may be any networking element arranged to carry out the MSC functions described herein. Thus, MSC 108 may include a communication interface, a processor, and data storage comprising instructions executable by the processor to carry out those MSC functions. The communication interface may include one or more wired and/or wireless interfaces for communicating with at least BSC 106 and PSTN 120. In general, MSC 108 acts as a switch between PSTN 120 and one or more BSCs such as BSC 106, facilitating communication between mobile stations and PSTN 124, which may be the public switched telephone network.

Service-provider network 110 may encompass all of the network elements depicted in FIG. 1 as being included in its dashed-cloud shape. In general, there may be more and/or different communication links among entities within service-provider network 110, and there may be more and/or different connections between service-provider network 110 and outside entities. Furthermore, there may be a core packet network (not depicted) making up part of service-provider network 110, which may enable devices therein to communicate with each other. There may also be one or more other packet-data networks and/or elements, one or more circuit-switched networks and/or elements, one or more signaling networks and/or elements, and/or one or more of any other suitable network(s) and/or element(s).

PDSN 112 may be any networking element arranged to carry out the PDSN functions described herein. As such, PDSN 112 may include a communication interface, a processor, and data storage comprising instructions executable by the processor for carrying out those PDSN functions. The communication interface may include one or more wired and/or wireless interfaces for communicating with at least BSC 106 and Internet 114. In general, PDSN 112 acts as a network access server between Internet 114 and BSCs such as BSC 106, facilitating packet-data communication between mobile stations and Internet 114, via macro base stations.

Internet 114 may be the well-known global packet-data network generally referred to as the Internet. However, Internet 114 may also be or include one or more other packet-data networks, without departing from the scope and spirit of the present invention. As such, Internet 114 may include one or more wide area networks, one or more local area networks, one or more public networks, one or more private networks, one or more wired networks, one or more wireless networks, and/or one or more networks of any other type. Devices in communication with Internet 114 may exchange data using a packet-switched protocol such as the Internet Protocol (IP), and may be identified by an address such as an IP address.

Call-data database 116, some aspects of which are described more fully in connection with FIG. 4, may be communicatively coupled with at least MSC 108 and PDSN 112, and may be capable of communicating with Internet 114 (perhaps via PDSN 112, or perhaps directly) in a wired and/or wireless manner. Further, call-data database 116 may include a network device such as a server, arranged to carry out the call-data database functions described herein. Call-data database 116 may also be a functional part of a network entity, such as BSC 106.

Media gateway (MG) 118 may be any networking element arranged to carry out the media-gateway functions described herein. As such, MG 118 may include a communication interface, a processor, and data storage comprising instructions executable by the processor for carrying out those media-gateway functions. The communication interface may include a circuit-switched interface and a packet-switched interface. MG 118 may (a) receive packet-based communications from SPN 110, convert those to circuit-switched communications, and pass them to PSTN 120 and (b) receive circuit-switched communications from PSTN 120, convert those to packet-based communications, and pass them to SPN 110.

Entity 122 may be any type of entity that is capable of engaging in a communication session with MS 102. As examples, entity 122 may be a cellular phone, a PDA, or a laptop computer. Other examples are also possible. Through communication system 100, entity 122 may engage in a voice call with MS 102. Of course, MS 102 might also or instead engage in other types of calls with other types of entities, through various communication paths.

When MS 102 is actively engaged in a call with another entity, a user of MS 102 may be able to interact with that other entity. For example, if the other entity is a telephone, the user may be able to engage in a call with another person (call participant) operating that telephone. And as another example, if the other entity is a web server, the user may be able to engage in a data session with that web server, such as by operating a web browser on the MS 102. Additional examples are possible as well.

b. An Exemplary Mobile Station

FIG. 2 is a simplified block diagram of an exemplary mobile station, which may be used in accordance with exemplary embodiments. As illustrated, MS 102 may include a processor 202, data storage 204, a user interface 206, a wireless communication interface 210, all coupled together by a system bus 214. In addition, MS 102 may include a global positioning system (GPS) receiver 208, to facilitate determining its location. Further, MS 102 may include any other mechanisms now known or later developed for such devices.

In an exemplary embodiment, data storage 204 may store a set of machine-language instructions, which are executable by processor 202 to carry out various functions described herein. (Note that, alternatively, some or all of those functions could instead be implemented through hardware.) In addition, data storage 204 may hold various data to facilitate carrying out the various functions described herein. For example, data storage 204 may hold data reflecting different colors that may be used to present a forecast indication to a user of the mobile station, the forecast indication reflecting a current likelihood of the mobile station successfully engaging in a communication session. In addition, data storage 204 may hold threshold data and user-interface data. And user interface 206 may function to facilitate interaction with a user of the mobile station. As such, user interface 206 may include buttons, a touch-screen, a microphone, and/or any other elements for receiving inputs, as well as a speaker, one or more displays, and/or any other elements for communicating outputs.

Wireless communication interface 210 may include a chipset suitable for communicating with one or more base stations over antenna 212. As an example, the chipset could be suitable for CDMA communication. The chipset or wireless-communication interface 210 in general may also be able to communicate with other types of networks and devices, such as EV-DO networks, Wi-Fi networks, Bluetooth devices, and/or one or more additional types of networks and devices. As examples, mobile station 102 could be or include a cell phone, a PDA, a computer, a laptop computer, a hybrid CDMA/EV-DO device, and/or a multi-mode cellular/Wi-Fi device.

c. An Exemplary BSC

FIG. 3 is a simplified block diagram of an exemplary BSC 106, which may be used in accordance with exemplary embodiments. As illustrated, BSC 106 includes a processor 302, a BTS interface 304, a gateway/switch interface 306, and a data storage 308, all interconnected via system bus 310. In an exemplary embodiment, data storage 308 may hold machine-language instructions that are executable by processor 302 to carry out various functions described herein. (Note that, alternatively, some or all of those functions could instead be implemented through hardware.) And data storage 308 may also hold data to facilitate carrying out various functions described herein. BTS interface 304 facilitates communication with BTS 104, and gateway/switch interface 306 facilitates communication with a gateway and/or switch, such as MSC 108 and/or PDSN 112.

d. An Exemplary Call-Data Database

FIG. 4 is a simplified block diagram of an exemplary set of data that may be stored in call-data database 116, which may be used in accordance with exemplary embodiments. As discussed above, call-data database 116 may be a network device, such as a server, arranged to carry out the call-data database functions described herein. Alternatively, call-data database 116 may be a functional part of a network entity, such as BSC 106 and/or MS 102 as examples.

As shown in FIG. 4, call-data database 116 may comprise a call-attempt table 400 for calls attempted by MS 102. In particular, table 400 may include data indicative of successful and unsuccessful attempts by MS 102 to engage in communication sessions over a first period of time. In addition to table 400, call-data database 116 may comprise one or more other types of data. Furthermore, table 400 could take other forms and be stored among multiple storage media, as the arrangement depicted by FIG. 4 is exemplary in nature.

In this example, three rows of call-attempt table 400 are explicitly displayed, each row identifying a telephone number that a user of MS 102 attempted to call. For each attempt, the telephone number that the user of MS 102 attempted to call may be a telephone number associated with the plain old telephone system (POTS), a mobile identification number (MIN) for a cellular phone, or any other number. Each row includes details such as the time, day, location of MS 102, and signal strength of MS 102 when the user of MS 102 attempted to call that telephone number. Further, each row includes an indication as to whether the attempt was successful or unsuccessful (according to any definition given herein, or any other definition). Other details such as trajectory of the MS 102 and/or date when a user of MS 102 placed the call could also be included in call-attempt table 400, as could one or more other values, instead of or in addition to those shown.

In one embodiment, a successful attempt by a user of MS 102 would be one in which a call to a particular telephone number is answered by a user at that particular telephone number. And an unsuccessful attempt by MS 102 would be one in which a call to a particular telephone number is not answered (i.e., an unanswered call) by the user (at the particular called telephone number). As an example, an unanswered call to the particular called telephone number could include a situation in which the call is forwarded to a voicemail account associated with the particular called telephone number.

In another embodiment, a successful attempt by a user of MS 102 would be one in which a call is established and completed without the call being dropped, and an unsuccessful attempt would be one in which the call is dropped or where there was a failure to even establish the call in the first place.

As shown in FIG. 4, row 402 identifies "375-555-3751" as a telephone number that a user of MS 102 attempted to call. The call attempt (to that telephone number) is further described by the time "14:10" in column 410, the day "Monday" in column 412, signal strength "20 dB" in column 418, all of which are associated with the user of MS 102 attempting to call the telephone number. The call attempt is further identified by latitudinal and longitudinal coordinates in columns 414 and 416, respectively, indicating the location of MS 102 when the user of MS 102 attempted to call the telephone number. And as indicated in column 420, the call attempt was unsuccessful.

Row 404 similarly identifies "666-555-1234" as another telephone number that a user of MS 102 attempted to call on "Monday" at "15:10". The call attempt (to this telephone number) is further described by the signal strength "19 dB" in column 418. The call attempt is further identified by latitudinal and longitudinal coordinates in columns 414 and 416, respectively, indicating the location of MS 102 when the user of MS 102 attempted to call the telephone number. And as indicated in column 420, the call attempt was successful.

Row 406 identifies a second call attempt to the same telephone number that a user of MS 102 attempted to call earlier that day at 14:10 to "375-555-3751." The second call attempt is further described by the time "18:10" in column 410, the day "Monday" in column 412, signal strength "15 dB" in column 418, all of which are associated with the user of MS 102 attempting to call the telephone number. The call attempt is further identified by latitudinal and longitudinal coordinates in columns 414 and 416, respectively, indicating the location of MS 102 when the user of MS 102 attempted to call the telephone number. And as indicated in column 420, unlike the first attempt, the second call attempt was successful.

3. Exemplary Operation

Figure 5:
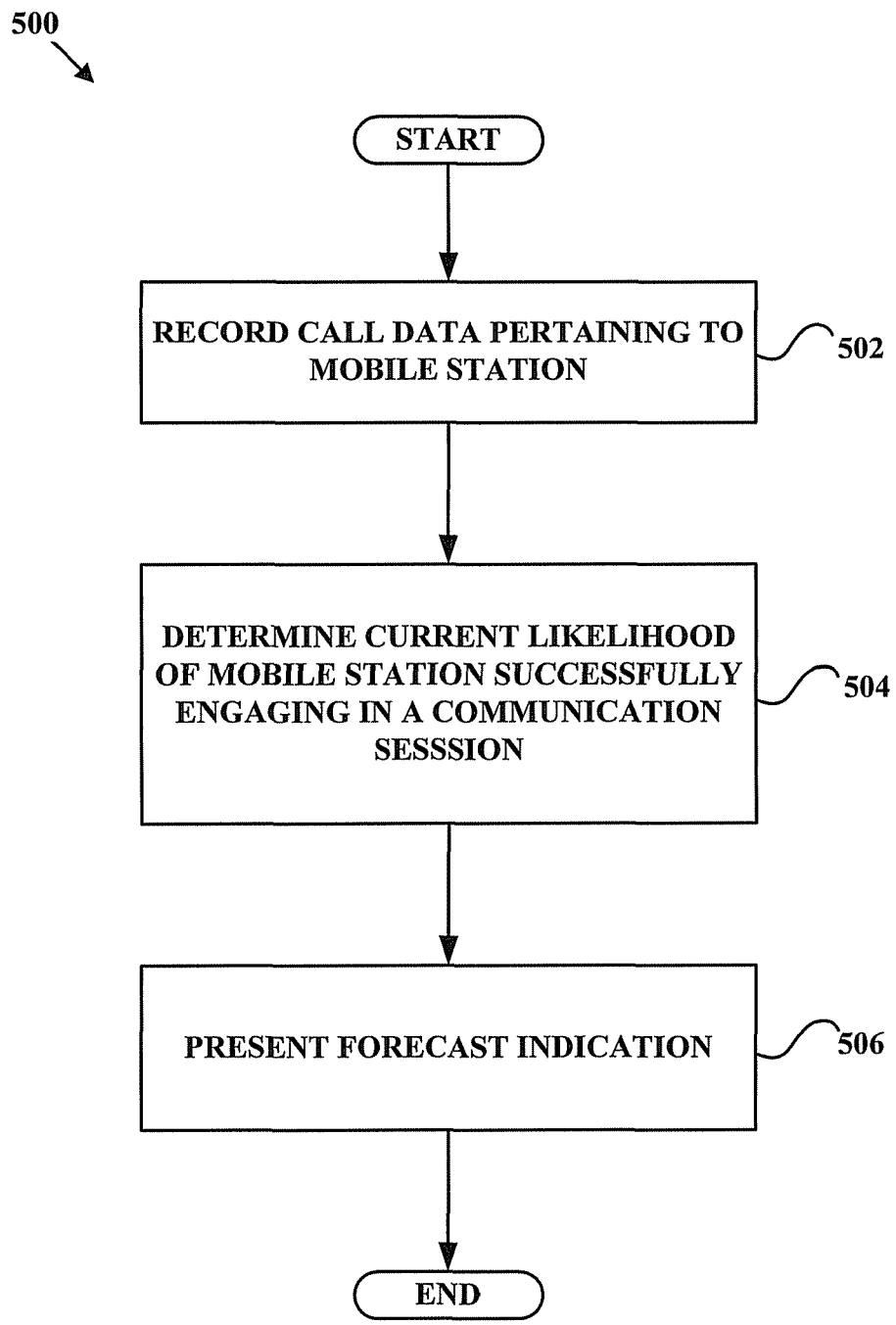
FIG. 5 is a flowchart of a method, in accordance with exemplary embodiments.

FIG. 5 depicts a flowchart of an exemplary method, in accordance with an exemplary embodiment. As shown in FIG. 5, method 500 begins at step 502 when call data pertaining to mobile station 102 is recorded, where the (recorded) call data includes data that is indicative of successful and unsuccessful attempts by mobile station 102 to engage in communication sessions over a first period of time. At step 504, a current likelihood of mobile station 102 successfully engaging in a communication session is determined based at least in part on the recorded call data. And at step 506, a forecast indication reflecting the determined current likelihood is presented to the user of mobile station 102.

It should be noted that method 500 could be carried out by mobile station 102 in cooperation with one or more other network entities, such as BSC 106, PDSN 112, and call-data database 116. For instance, in one embodiment, at step 502, call-data database 116 may record call data pertaining to mobile station 102 over a first period of time. At step 504, BSC 106 may query call-data database 116 and, based at least in part on the recorded call data in call-data database 116, BSC 106 may determine a current likelihood of MS 102 successfully engaging in a communication session. As explained herein, BSC 106 may communicate with MS 102 over a CDMA air interface, or over an air interface that operates according to any other wireless technology. BSC 106 may then send the determined current likelihood to mobile station 102. At step 506, mobile station 102 may then present a forecast indication to a user of MS 102, the forecast indication reflecting the determined current likelihood. In an alternative embodiment, all three steps of FIG. 5 could be carried out by MS 102.

Many embodiments are possible; in general it should be understood that method 500 could be carried out by any one or any combination of the devices, entities, and/or network elements described herein, and/or any other network element(s).

a. A First Embodiment

The first embodiment is directed to determining and presenting a current likelihood of a mobile station successfully engaging in a communication session with a particular called telephone number. In this embodiment, a successful attempt comprises an answered call to the particular called telephone number, while an unsuccessful attempt comprises an unanswered call to the particular called telephone number. As an example, an unanswered call to the particular called telephone number could include a situation in which the call is forwarded to a voicemail account associated with the particular called telephone number. As another example, an unanswered call to the particular called telephone number could include a situation in which the calling party hangs up or disconnects the call before the call is answered or before the call is forwarded to the voicemail account.

Figure 6:
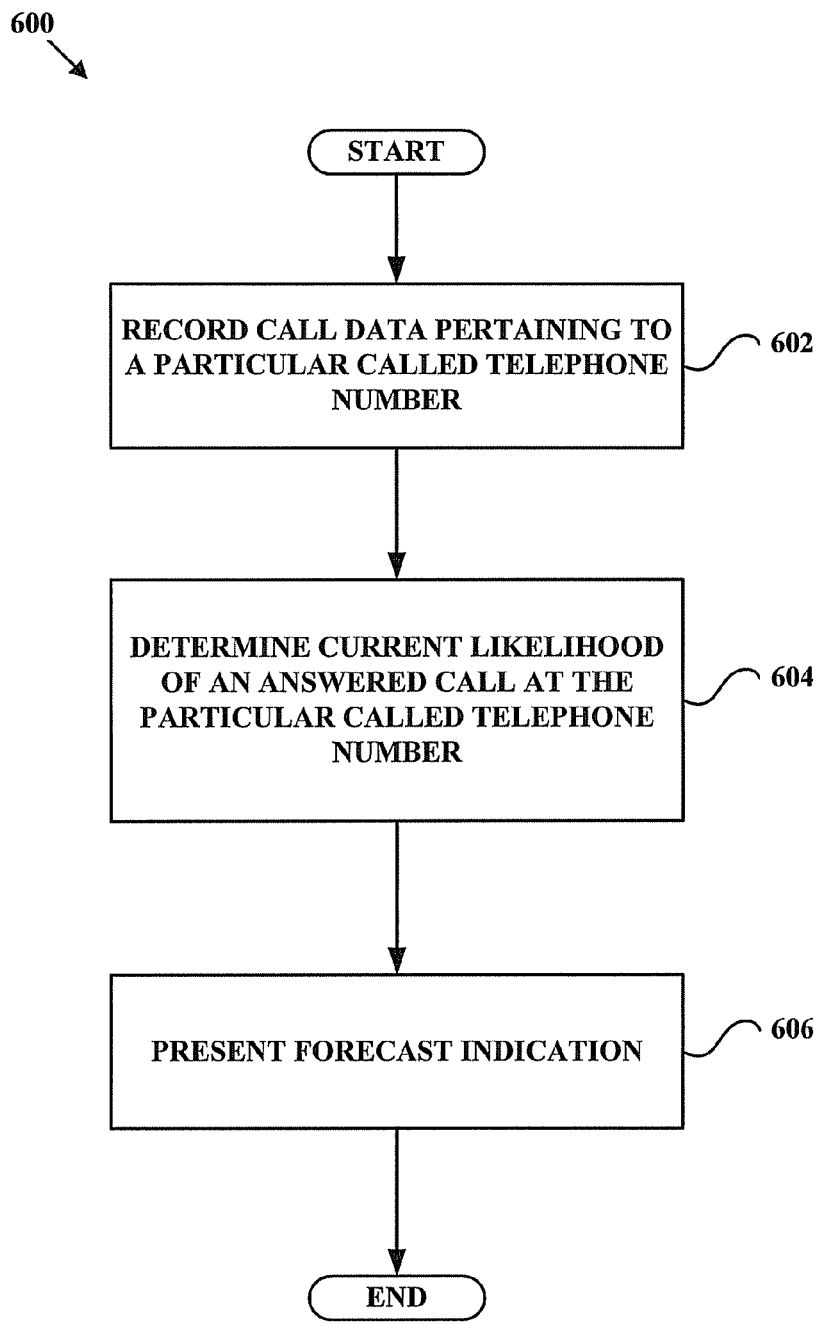
FIG. 6 is a flowchart of a method, in accordance with exemplary embodiments.

FIG. 6 depicts a flowchart of an exemplary method, in accordance with this embodiment. As shown in FIG. 6, method 600 begins at step 602, when BSC 106 records call data pertaining to a particular called telephone number from mobile station 102, the call data indicative of successful and unsuccessful attempts by the mobile station 102 to engage in communication sessions over a first period of time. BSC 106 may record call data including the called telephone number, the time, the day, the location of MS 102, and whether the attempt was successful (or unsuccessful) in call-attempt table 400, which may be stored in call-data database 116.

At step 604, BSC 106 determines, based at least in part on the recorded call data pertaining to the particular called telephone number, a current likelihood of an answered call at the particular called telephone number. BSC 106 may determine the current likelihood by correlating the current time of day and day of the week with at least one recorded time of day and day of the week to determine the current likelihood of an answered call to the particular called telephone number. BSC 106 may determine a higher current likelihood for an answered call at a particular called telephone number for which mobile station 102 was successful in establishing a communication session on the same day as the current day and/or around the same time as the current time than a particular called telephone number for which the mobile station 102 was unsuccessful in establishing a communication session.

It should be noted that the step 604 (and 606 for that matter) may be carried out only after the user of the mobile station has attempted to call the particular called telephone number at least a predetermined number of times. After BSC 106 makes the determination pertaining to the particular called telephone number, BSC 106 sends the determined current likelihood to mobile station 102.

At step 606, mobile station 102 presents a forecast indication, the forecast indication reflecting the determined current likelihood of an answered call at the particular called telephone number. In one embodiment, the mobile station 102 may present the forecast indication for a particular called telephone number in an address book entry. The forecast indication may be a visual indication, such as a color scheme in which (i) a first color may indicate that an answered call is more likely than an unanswered call and (ii) a second color, different from the first color, may indicate that an unanswered call is more likely than an answered call. Alternatively, the forecast indication could be in the form of graphical icons, sound-bytes, or any or any type of indication (or combination of one or more indications) capable of reflecting the determined likelihood. And other possibilities exist as well.

Figure 7A:
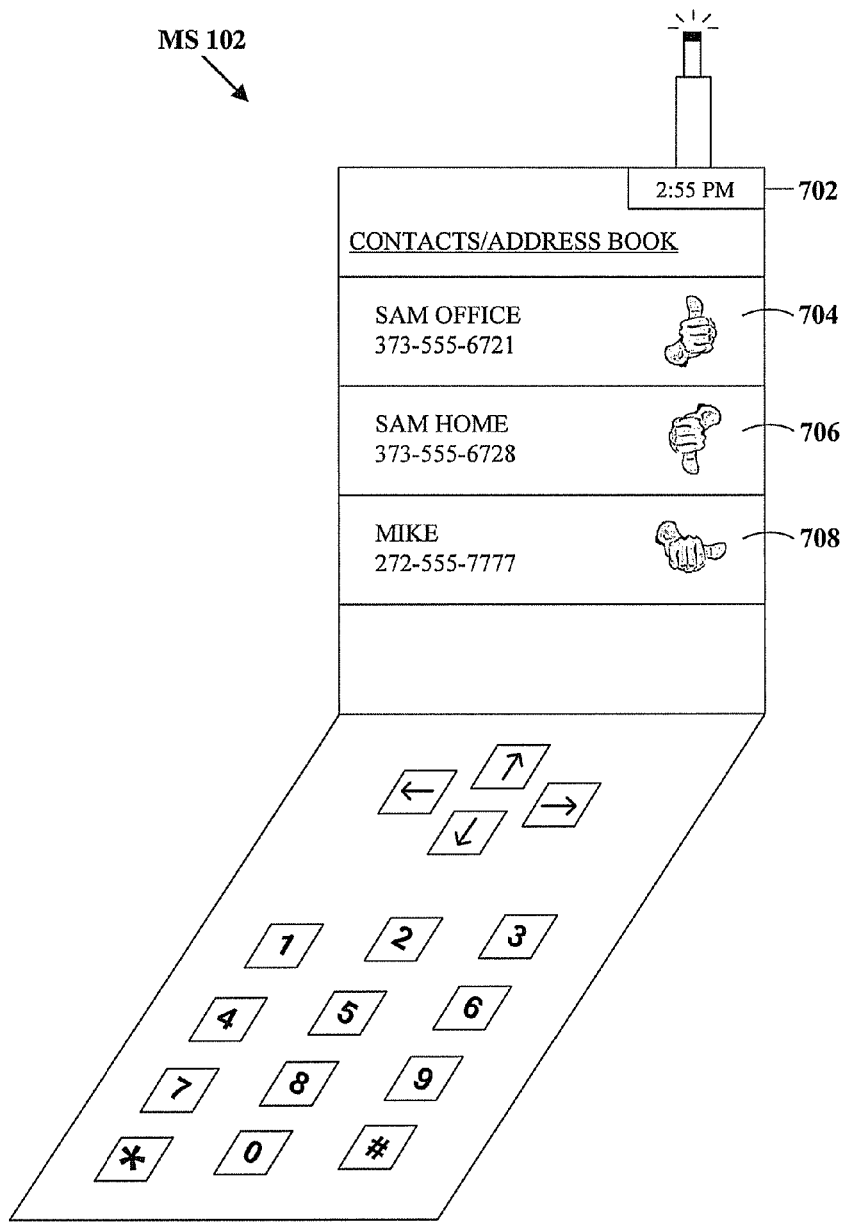
FIGS. 7A-7B are simplified block diagrams of user interfaces of a mobile station, in accordance with exemplary embodiments.

FIG. 7A illustrates an exemplary embodiment in which mobile station 102 presents graphical icons reflecting the determined likelihood for multiple particular called telephone numbers stored in an address book. Entry 704 indicates a thumbs-up sign reflecting that there is a greater likelihood of "Sam" picking up his office phone at "2:55 PM" (the current time shown in item 702 of FIG. 7A) than his home phone, as indicated by the thumbs-down sign in entry 706. The thumbs-down sign in entry 706 may indicate that if a user of mobile station 102 were going to call "Sam" at his house phone number, there is greater likelihood that the user of mobile station 102 may receive Sam's voicemail account than there is of Sam answering. Entry 708 indicates an open-hand sign (which is neither a thumbs-up sign or a thumbs-down sign) indicating that Mike may or may not pick up his phone. Entry 708 may reflect this graphical icon because user of mobile station 102 may not have called Mike enough times for a likelihood to be accurately determined. In other cases, the determined likelihood may be within a threshold amount of 50%. And other possibilities exist as well.

Figure 7B:
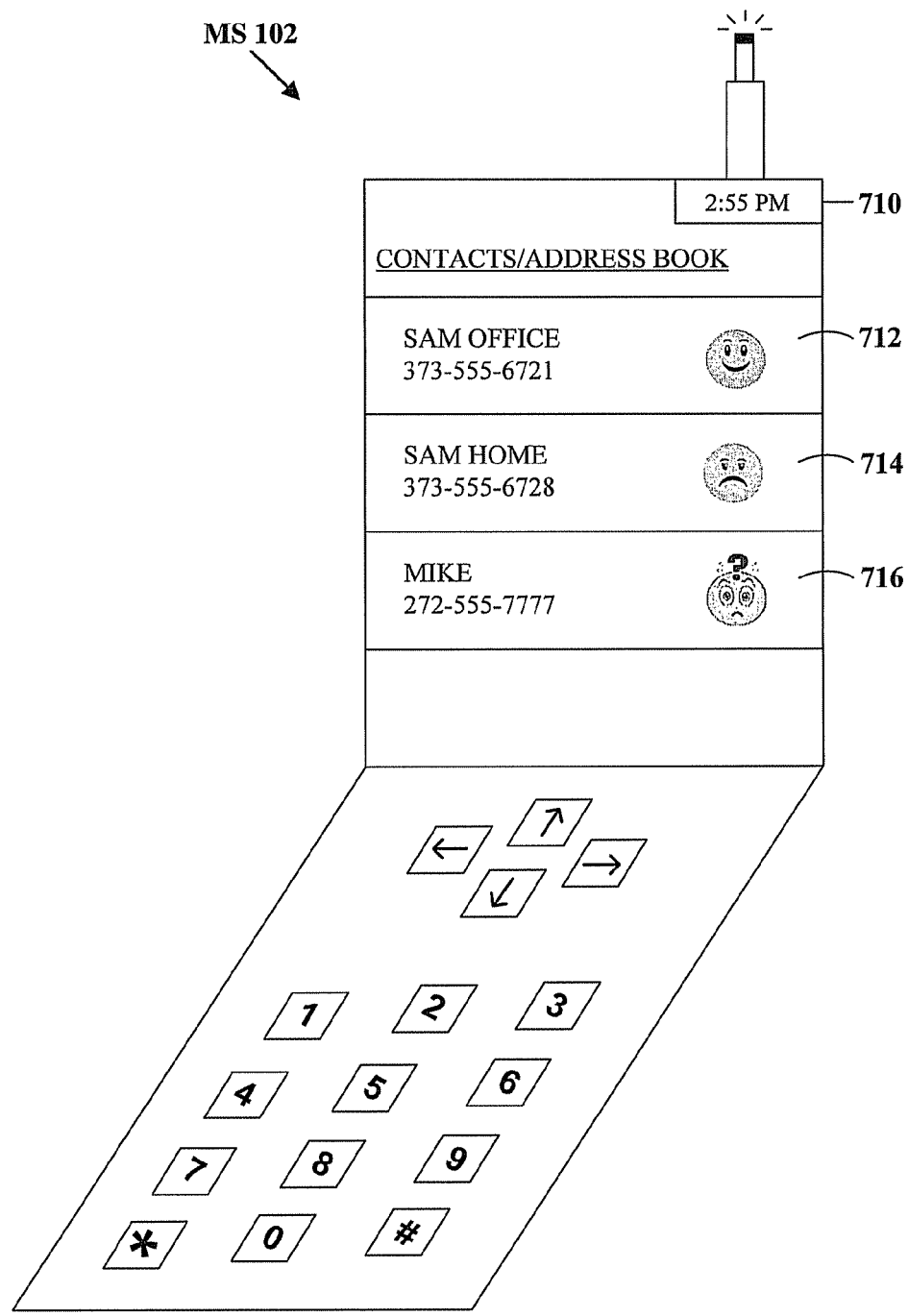

It should be understood that graphical icons used in FIG. 7A are only exemplary in nature. Other graphical icons, such as "smiley face" icons or icons reflecting numerical values could be used instead. FIG. 7B illustrates the same exemplary embodiment illustrated in FIG. 7A, in which mobile station 102 presents graphical icons reflecting the determined likelihood for multiple particular called telephone numbers stored in an address book; the only difference is the graphical icons associated with each of the each of the entries of the address book. As shown in FIG. 7B, entry 712 indicates a happy "smiley-face" icon reflecting that there is a greater likelihood of "Sam" picking up his office phone at "2:55 PM" (the current time shown in item 710 of FIG. 7B) than his home phone, as indicated by the sad "smiley-face" in entry 714. The sad "smiley-face" icon in entry 714 may indicate that if a user of mobile station 102 were going to call "Sam" at his house phone number, there is greater likelihood that the user of mobile station 102 may receive Sam's voicemail account than there is of Sam answering. Entry 716 indicates a confused "smiley-face" icon (which is neither a happy or sad "smiley-face" icon) indicating that Mike may or may not pick up his phone.

Further, it should be understood that even though the steps in FIG. 6 has been described as being carried out by mobile station 102, one or more network entities could, instead or in addition to the mobile station 102, carry out the steps in FIG. 6. For instance, a network entity may determine one or more current likelihoods overnight. In one embodiment, the network entity may determine one more current likelihoods for a particular called telephone number. Each of the one or more determined current likelihoods may correspond to a time period during the day. For instance, the network entity may determine three current likelihoods for entry 704 in FIG. 7A. The first determined current likelihood may correspond to a likelihood that a mobile station may be able to call from 8:00 AM-4:00 PM. The second determined currently likelihood for entry 706 may correspond to a time range from 4:00 PM-12:00 AM. And the third determined current likelihood for entry 706 may correspond to a time range from 12:00 AM-8:00 AM. In such a case, the network entity may provision the mobile station with the one or more current likelihoods every morning, which the mobile station may present at predetermined times of the day. Any many other possibilities exist as well, without departing from the invention.

b. A Second Embodiment

The second embodiment is directed to determining and presenting a current likelihood of the mobile station successfully engaging in any call that a mobile station may attempt to make (rather than treating called numbers individually) In this embodiment, a successful attempt by mobile station 102 could be one in which a call is established and completed without the call being dropped, while an unsuccessful attempt could be one in which the call is dropped or where there was a failure to even establish the call in the first place. As an example, an established and completed call could be one that is affirmatively disconnected (by closing a flip phone or pressing "End," as examples) by either party (the calling party or the called party) once their conversation is over.

In this embodiment, BSC 106 records call data pertaining to mobile station 102. BSC 106 may record the attempted telephone number, the time, the day, the location of MS 102, trajectory of the MS 102, and/or date, and also record whether the attempt was successful (or unsuccessful) in call-attempt table 400, which may be stored in call-data database 116.

In this embodiment, BSC 106 may then determine the current likelihood by comparing a current time of day with at least one recorded time of day, comparing a current day of the week with at least one recorded day of the week, comparing a current location of the mobile station with at least one recorded location of the mobile station, comparing a current trajectory of the mobile station with at least one recorded trajectory of the mobile station. Thereafter, BSC 106 may send the determined current likelihood to mobile station 102. Mobile station 102 may use the determined current likelihood to present a forecast indication to mobile station 102, the forecast indication reflecting the determined current likelihood.

The forecast indication could be a visual indication, which could include at least one textual phrase selected from the group consisting of "Clear and Sunny", "Overcast and Cloudy", and "Rainy and Wet," where (i) the phrase "Clear and Sunny" may indicate that an successful attempt is more likely than an unsuccessful attempt (ii) the phrase "Overcast and Cloudy," may indicate that an successful attempt is less likely than an unsuccessful attempt, and (iii) the phrase "Rainy and Wet," may indicate that a successful attempt is not likely at all. Alternatively, the visual indication could be in the form of graphical icons reflecting the determined likelihood.

Figure 8A:
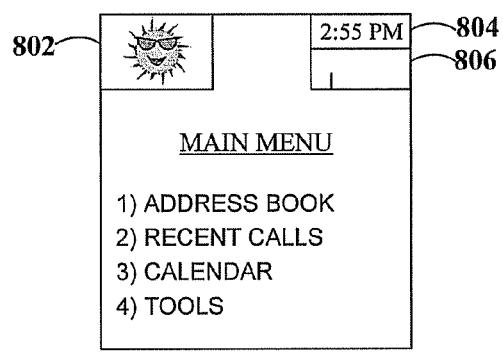
FIGS. 8A-8C are simplified block diagrams of user interfaces of a mobile station at various times throughout a given day, in accordance with exemplary embodiments.
Figure 8B:
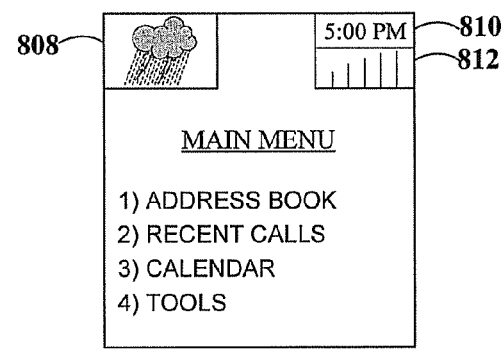
Figure 8C:
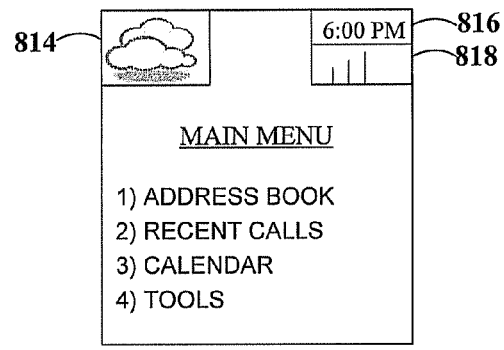

FIGS. 8A-8C illustrate three exemplary embodiments in which mobile station 102 presents three different graphical icons at various times during a given day. As shown in FIG. 8A, mobile station 102 presents a "Clear and Sunny" icon 802 at "2:55 PM" when mobile station 102 has one bar of signal strength (as shown in item 806). In this scenario, a user of mobile station 102, based in part on his location, time, day, trajectory, and/or any other recorded call data indicating his previous calling experiences, may generally be more successful in establishing a communication session at "2:55 PM" even though mobile station 102 only has one bar of signal strength. In FIG. 8B, mobile station 102 presents a "Rainy and Wet" icon 808 at "5:10 PM" when mobile station 102 has five bars of signal strength. In this scenario, a user of mobile station 102 may be less successful in maintaining a communication session even though his phone has five bars of signal strength. In FIG. 8C, mobile station 102 presents a "Overcast and Cloudy" icon 814 at "6:00 PM" when mobile station has about three bars of signal strength.

It should be understood that mobile station 102 may present and change the current likelihood of the mobile station successfully engaging in a communication session on a real-time basis based in part on the time, location, day, and/or trajectory of the mobile station. The icons may be updated at fixed time intervals as the user moves through out the day. Alternatively, a network entity may determine one or more current likelihoods overnight. In such a case, the network entity may provision the mobile station with the one or more current likelihoods every morning, which the mobile station may present at predetermined times of the day. Any many other possibilities exist as well, without departing from the invention.

Figure 9:
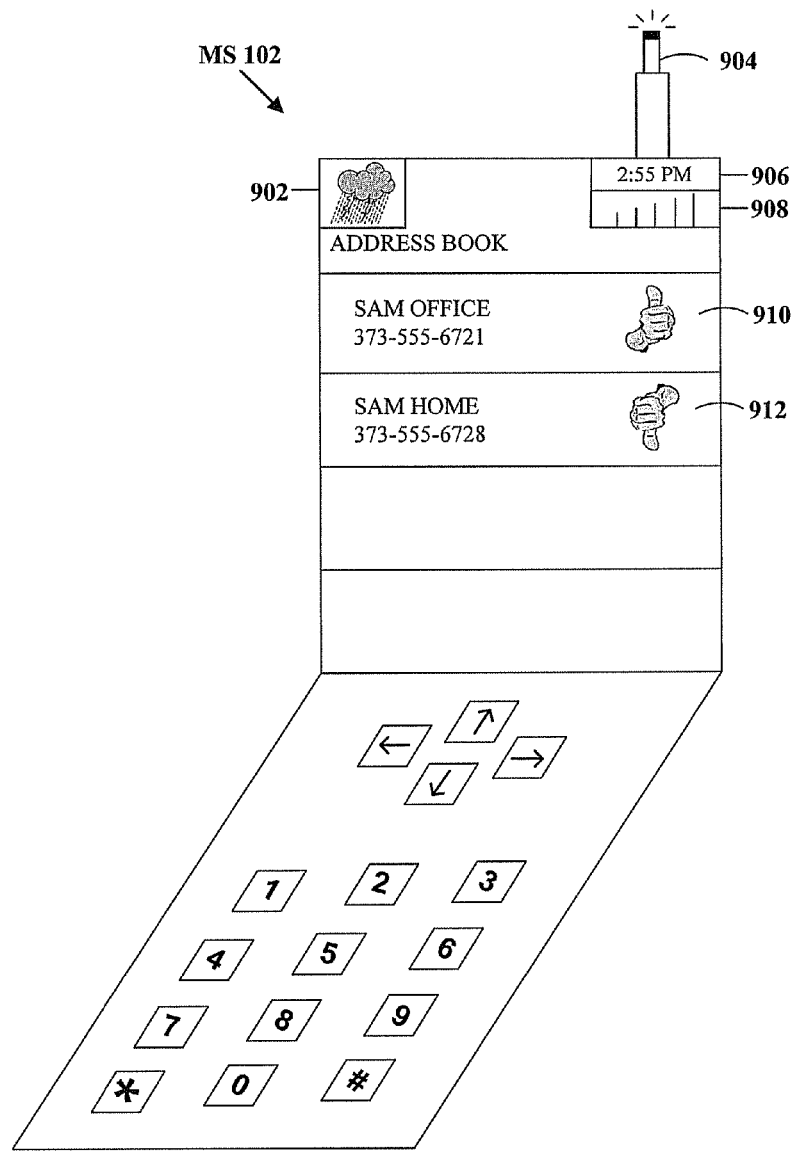
FIG. 9 is a simplified block diagram of a user interface of a mobile station, in accordance with exemplary embodiments.

Further, any visual or other forecast indication described herein in connection with any embodiment may be used in connection with any other embodiment, without departing from the invention. For instance, the two embodiments described above are not in any way mutually exclusive; the two embodiments could be combined along with any other possible embodiments. FIG. 9 illustrates an exemplary embodiment in which mobile station 102 presents a "Rainy and Wet" icon 902 along with graphical icons reflecting the determined likelihood for multiple particular called telephone numbers stored in an address book. In this scenario, a user of mobile station 102, may have a better chance (or a greater likelihood) of reaching "Sam" at his office phone (indicated in entry 910 by the thumbs-up sign) than at his home phone (indicated in entry 912 by the thumbs-down sign) even though the user of mobile station 102 may generally not be successful in establishing a communication session based in part on his location, time, day, trajectory, and/or any other recorded call data indicating his previous calling experiences (indicated by "Rainy and Wet" icon 902).

4. Conclusion

Various exemplary embodiments have been described above. Those skilled in the art will understand, however, that changes and modifications may be made to those examples without departing from the scope of the claims.

The invention claimed is:

1. A method comprising:
   recording call data pertaining to a mobile station, the call data comprising data indicative of successful and unsuccessful attempts by the mobile station to engage in communication sessions over a first period of time, wherein recording call data pertaining to the mobile station comprises recording call data pertaining to a particular called telephone number, wherein each successful attempt comprises an answered call to the particular called telephone number, and wherein each unsuccessful attempt comprises an unanswered call to the particular called telephone number;
   determining, based at least in part on the recorded call data, a current likelihood of the mobile station successfully engaging in a communication session, wherein determining, based at least in part on the recorded call data, the likelihood of the mobile station successfully engaging in a communication session comprises determining, based at least in part on the recorded call data pertaining to the particular called telephone number, a current likelihood of an answered call to the particular called telephone number; and
   presenting a forecast indication to a user of the mobile station, the forecast indication reflecting the determined current likelihood of an answered call to the particular called telephone number,
   wherein the particular called telephone number is stored in an address book entry of an address book of the mobile station, and wherein the forecast indication comprises a visual indication in the address book entry.

2. The method of claim 1, wherein an unanswered call to the particular called telephone number comprises a call being forwarded to a voicemail account associated with the particular called telephone number.

3. The method of claim 1, wherein recording call data pertaining to the particular called telephone number comprises recording a time of day and a day of the week for each answered and unanswered call to the particular called telephone number.

4. The method of claim 3, wherein determining, based at least in part on the recorded call data pertaining to the particular called telephone number, the current likelihood of an answered call to the particular called telephone number comprises correlating the current time of day and day of the week with at least one recorded time of day and day of the week to determine the current likelihood of an answered call to the particular called telephone number.

5. The method of claim 1, wherein the steps of determining and presenting are carried out only after the user of the mobile station has attempted to call the particular called telephone number at least a predetermined number of times.

6. The method of claim 1, wherein the visual indication comprises a color scheme that reflects the determined current likelihood of an answered call to the particular called telephone number.

7. The method of claim 6, where in the color scheme comprises (i) a first color that indicates that an answered call is more likely than an unanswered call and (ii) a second color, different from the first color, that indicates that an unanswered call is more likely than an answered call.

8. The method of claim 1, wherein:
   each successful attempt comprises establishing a call and completing the call without the call being dropped.

9. The method of claim 8, wherein recording call data pertaining to the mobile station comprises recording at least one of a time of day, a day of the week, a location of the mobile station, and a trajectory of the mobile station for each successful attempt and unsuccessful attempt.

10. The method of claim 9, wherein determining, based at least in part on the recorded call data, a current likelihood of the mobile station successfully engaging in a communication session comprises at least one of comparing a current time of day with at least one recorded time of day, comparing a current day of the week with at least one recorded day of the week, comparing a current location of the mobile station with at least one recorded location of the mobile station, comparing a current trajectory of the mobile station with at least one recorded trajectory of the mobile station.

11. The method of claim 8, wherein the forecast indication comprises a visual indication.

12. The method of claim 11, wherein the visual indication comprises at least one textual phrase selected from the group consisting of "Clear and Sunny", "Overcast and Cloudy", and "Rainy and Wet."

13. The method of claim 11, wherein the visual indication comprises a color scheme that reflects the determined current likelihood of the mobile station successfully engaging in a communication session, wherein the color scheme comprises (i) a first color that indicates that a successful attempt is more likely than an unsuccessful attempt, and (ii) a second color, different than the first color, that indicates that an unsuccessful attempt is more likely than a successful attempt.

14. A computing device comprising:
   a processor;
   data storage; and
   machine language instructions stored in the data storage and executable by the processor (i) to record call data pertaining to a mobile station, the call data comprising data indicative of successful and unsuccessful attempts by the mobile station to engage in communication sessions over a first period of time, (ii) to determine, based at least in part on the recorded call data, a current likelihood of the mobile station successfully engaging in a communication session, and (iii) to present a forecast indication to a user of the mobile station, the forecast indication reflecting the determined current likelihood,
   wherein recording call data pertaining to the mobile station comprises recording call data pertaining to a particular called telephone number, wherein each successful attempt comprises an answered call to the particular called telephone number, and wherein each unsuccessful attempt comprises an unanswered call to the particular called telephone number,
   wherein determining, based at least in part on the recorded call data, the likelihood of the mobile station successfully engaging in a communication session comprises determining, based at least in part on the recorded call data pertaining to the particular called telephone number, a current likelihood of an answered call to the particular called telephone number, and
   wherein the forecast indication reflects the determined current likelihood of an answered call to the particular called telephone number,
   wherein the particular called telephone number is stored in an address book entry of an address book of the mobile station, and wherein the forecast indication comprises a visual indication in the address book entry.

15. The computing device of claim 14, wherein the computing device is the mobile station.

16. The computing device of claim 14, wherein the computing device is a base station with which the mobile station communicates over an air interface.

17. The computing device of claim 14, wherein the computing device is a network entity.

* * * * *